United States Patent [19]

Jenson

[11] Patent Number: 4,843,564
[45] Date of Patent: Jun. 27, 1989

[54] APPARATUS AND METHOD FOR MEASURING FREQUENCY OF COHERENT COMPONENT OF A COMPOSITE SIGNAL

[75] Inventor: Leslie M. Jenson, St. Paul, Minn.
[73] Assignee: TSI Incorporated, St. Paul, Minn.
[21] Appl. No.: 41,417
[22] Filed: Apr. 23, 1987
[51] Int. Cl.⁴ .............................................. G01P 3/36
[52] U.S. Cl. .................................... 364/510; 356/28; 340/606; 364/565
[58] Field of Search ............... 364/510, 484, 565, 556; 356/27, 28, 28.5, 369; 324/78 R, 78 J, 78 Q, 78 Z; 340/606, 658, 670

[56] References Cited

U.S. PATENT DOCUMENTS

| | | | |
|---|---|---|---|
| 3,002,048 | 9/1961 | Bailey et al. | 358/76 |
| 3,743,420 | 7/1973 | Iten et al. | 356/28 |
| 3,895,872 | 7/1975 | Danoliker et al. | 356/28.5 |
| 3,991,365 | 11/1976 | Takeuchi | 324/78 R |
| 4,036,557 | 7/1977 | Christensen | 356/369 |
| 4,037,151 | 7/1977 | Takeuchi | 324/78 R |
| 4,051,433 | 9/1977 | Dimotakis et al. | 324/78 R |
| 4,157,850 | 6/1979 | Marouby | 303/109 |
| 4,224,568 | 9/1980 | Griner | 324/78 D |
| 4,263,002 | 4/1981 | Sathyakumar | 356/28.5 |
| 4,334,543 | 6/1982 | Fehr | 364/510 |
| 4,362,394 | 12/1982 | Menlove | 368/118 |
| 4,387,993 | 6/1983 | Adrian | 356/336 |
| 4,403,184 | 9/1983 | Witt et al. | 324/78 R |
| 4,470,696 | 9/1984 | Ballard | 356/28 |
| 4,484,291 | 11/1984 | Schlösser | 324/78 Z |
| 4,646,004 | 2/1987 | Brandt et al. | 324/78 |

Primary Examiner—Gary Chin
Assistant Examiner—Brian M. Mattson
Attorney, Agent, or Firm—Burd, Bartz & Gutenkauf

[57] ABSTRACT

A Doppler velocimeter having laser generating crossing light beams provides a crossing and focus area forming a measuring volume having regions of high and low light intensity. Solid or liquid particles moving through the measuring volume scatter light which is sensed and converted into a signal having a frequency. A signal processor measures the frequency by detecting and tracking an individual zero crossing of a particle through the measuring volume to provide real time information about the coherent component of the signal. This information is useable to determine the velocity of the particle moving through the measuring volume.

24 Claims, 6 Drawing Sheets

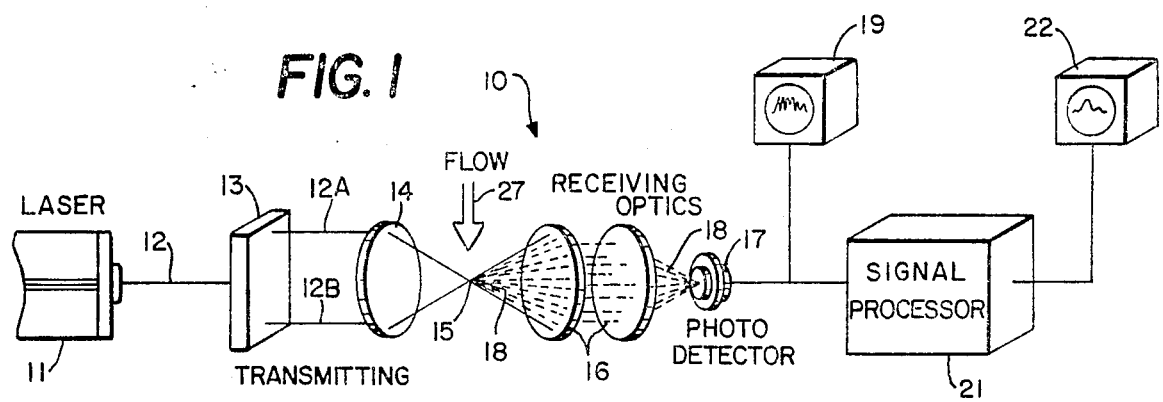
FIG. 1
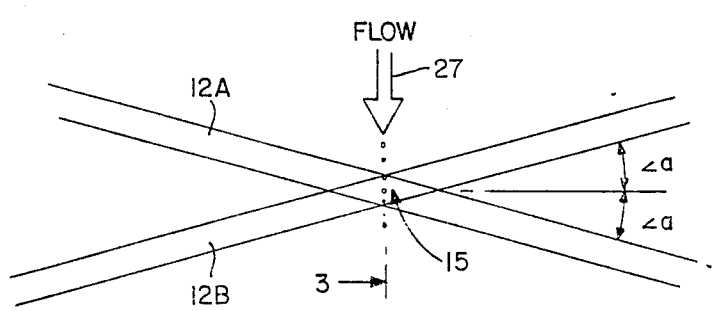
FIG. 2
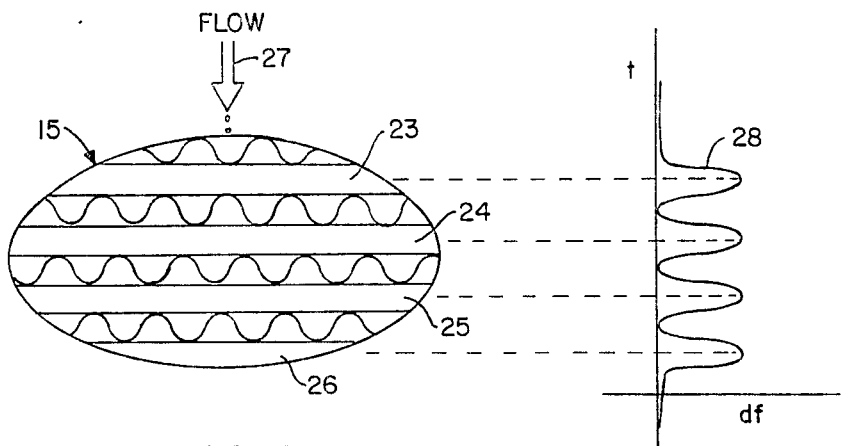
FIG. 3
FIG. 4 ent component may be discontinuous, subject to phase reversals or have phase jitter of the same order and magnitude. The measured frequency is used to measure motion of a flowing solid or fluid particles.

APPARATUS AND METHOD FOR MEASURING FREQUENCY OF COHERENT COMPONENT OF A COMPOSITE SIGNAL

FIELD OF INVENTION

The present invention relates to a frequency measuring system that measures the frequency of a coherent component of a composite signal. The frequency measurement is accomplished even though the coherent component may be discontinuous, subject to phase reversals or have phase jitter of the same order and magnitude. The measured frequency is used to measure motion of a flowing solid or fluid particles.

BACKGROUND OF INVENTION

Prior art systems have been proposed for extracting the coherent component of the input signal, even though the desired signal is a discontinuous, low duty cycle and buried in noise of the same magnitude. Among the techniques previously employed include correlators, Fourier transform analyzers, phase lock loops, and counter processors. At present, phase lock loops and counter processors are the most prevalent. Phase locked loops work well on composite signals that have discontinuities, phase changes, phase jitter and noise an order of magnitude higher than the coherent signal. Phase locked loop systems are particularly adapted to such applications in that the gain of the tracking loop and its band width can be easily adjusted to fit the requirements of a particular situation. Once the locked loop system has locked onto the desired component, the rejection of unwanted noise components is very good.

Phase locked loop systems have certain limitations. Among them is that they can be disturbed easily while in operation by abrupt phase reversals and may completely lose lock of the coherent components when the duty cycle becomes low. The phase locked loop system has a very narrow captive range making it difficult to control the system to capture a coherent signal if the properties of the coherent signal include large and fast fluctuations in frequency compared to the capture range along with a low duty cycle.

Counter processors are particularly adapted to measure the coherent component in a composite signal where the properties of the coherent component are discontinuous, have phase changes and random noise an order of magnitude smaller than the coherent component of this composite signal. Counter processors are particularly well adapted to measuring the coherent component of the signal when the duty cycles are very low, i.e. a few tenths of a percent and when the coherent component includes a large and fast fluctuation in frequency. Order of magnitude changes in frequency at hundreds of kilohertz fluctuation rates are easily measured.

Counter processors have certain limitations. Among these limitations are that they are sensitive to the absolute random noise component amplitude. The noise amplitude generally must be maintained below a particular threshold level, and the coherent component must be maintained above a second threshold, i.e. approximately 2.5 times the noise threshold. If this criteria is not maintained, the counter processor may produce erroneous measurements. In order to prevent these erroneous measurements, the absolute amplitude of the composite signal must be properly adjusted to keep the noise below the noise threshold.

SUMMARY OF INVENTION

There are situations in which it is desirable to measure the coherent frequency component of a composite signal when the composite signal has phase changes, and/or a low duty cycle with high fluctuation in absolute composite signal amplitude.

The apparatus and method of the invention measures the frequency of a coherent component or portion of a composite signal to provide real time information about the component of the composite signal. The apparatus has means to produce a composite signal and a first or electrical signal during a selected time period. A timer establishes time intervals of the composite signal during the selected time period. A second signal is generated with the use of pulse logic only during a selected time interval. A summer counts the second signals. A gated timer controlled by the summer allows an output signal when a selected time interval is completed. The output signal is converted into readable real time information about the coherent component of the composite signal.

The signal processor of the present invention was developed for use in conjunction with a laser Doppler velocimeter. This instrument uses two laser beams to create an interference pattern at some point in space and is used to measure the velocity of particles suspended in air. This creates a short burst of signals with the coherent component's frequency proportional to velocity.

An embodiment of an apparatus that includes the frequency measuring structure and method of the invention measures the velocity of flowing solid or fluid particles. The apparatus has a laser for generating a light beam. The light beam is split into separate light beams and focused in a crossing and focusing area providing a measuring volume having alternate regions of high light intensity and low light intensity. Two separate lasers can be used to generate the light beams. The particles flow through the measuring volume normal to the regions of light intensity and produce variations in the intensity of scattered light. The variations in the scattered light are sensed which produce an electrical signal having a frequency related to the variations in the intensity of the scattered light. This signal is proportional to the velocity at which the particle moves through the measuring volume. The signal has a segment representative of the zero crossing of a particle through the measuring volume. A signal processor that includes the frequency measuring system accommodates the electrical signal. The processor has means to detect and track an individual zero crossing of a particle through the measuring volume to provide real time information about the coherent component of the signal.

The means to detect and track a zero crossing of a particle includes a zero crossing detector for generating zero crossing pulses during a time period. Coherence detection logic receives the zero crossing pulses and provides a signal for a zero crossing at a selected time interval of the time period. The time period is divided into a plurality of time segments or intervals, such as a first, second, and third time intervals. In one embodiment of the invention, the third time interval is equal to the sum of the first and second time intervals. The third time interval is the selected time interval. A time interval generator sets the time intervals of the signal. An n-bit summer counts the signals for a zero crossing at a selected time interval and controls the operation of a gated timer. The gated timer operates after a selected number of signals have been counted by the summer to allow an output signal during a selected time interval.

The search and measurement system may be divided into a search section and a measurement section with each section connected to a zero crossing detector to receive zero crossing pulses therefrom. Each section has a coherent detection logic that swallows a zero crossing pulse if it occurs during the first time interval. All remaining zero crossing pulses are fed to a time interval generator that sets the time intervals in a selected time period. In the event that a zero crossing occured during the second or beyond the third time period, a summer is reset to start a new time period. When the zero crossing occurs during the selected or third time interval, the signal is fed to an n-bit summer which counts a selected number of signals. When the selected number of signals are summed, a gated timer allows an output signal which provides real time information about the coherent component of the signal. When the measurement system is processing zero crossing and coherence is detected, the search process is gated off. When coherence is not detected, the search process is allowed to function. The search process finds a new zero time that is equal to the actual zero time of the auto correlation function. It then updates the time interval generator of the measurement section.

The invention includes a method of measuring the frequency of a coherent component of a composite signal, resulting from particles moving to a measuring volume having regions of high and low light intensity. The particles, when moving through the measuring volume, produce variations in the intensity of scattered light which are sensed to produce a signal representative of the variations of the intensity of the sensed scattered light. A zero crossing of a particle moving through the measuring volume is detected during an established time interval of a selected time period. A zero crossing pulse is generated during the selected time period providing a signal of the zero crossing at a selected time interval. These signals are counted only for the selected time interval. When a determined number of signals are counted, an output signal is produced to provide real time information about the coherent component of the zero crossing signal. The method includes the use of a plurality of time intervals during the time period. The selected time interval is the last time interval. In one form of the method, the time interval comprises first, second, and third time intervals. The selected time interval is the third time interval. The sum of the first and second time intervals equals the third time interval.

The method broadly measures the frequency of a coherent component of a composite signal which can be derived from a number of sources, for example, pulsed radar and pulsed sonor signals. A first signal of the composite signal is detected during a selected time period. The time period is divided into time intervals, such as three consecutive time intervals. A pulse from the first signal is generated during the selected time period. A second signal is provided from only a pulse at a selected time interval of the time period. The second signals are counted. When a selected number of second signals are summed or counted, an output signal is created. The output signal provides real time information about the coherent component of the composite signal.

Among the several objects of the present invention are the provision of a frequency measuring system which will measure the frequency of one component of a composite input signal, and the provision of such a frequency measuring system that is relatively insensitive to phase reversals, discontinuity, low duty cycle and changes in the absolute magnitude of the composite signal. The frequency measuring system is highly reliable and relatively simple and inexpensive to construct. Other objects and features will be in part apparent and pointed out hereinafter.

DESCRIPTION OF THE DRAWING

FIG. 1 is a diagrammatic view of a standard differential Doppler system;

FIG. 2 is a diagrammatic view of crossing light beams delineating the crossing and focusing area of the light beams;

FIG. 3 is an enlarged sectional view taken along the line 3—3 of FIG. 2;

FIG. 4 is a time-frequency diagram representative of a particle moving through the measuring volume of FIG. 3;

Figure 7:
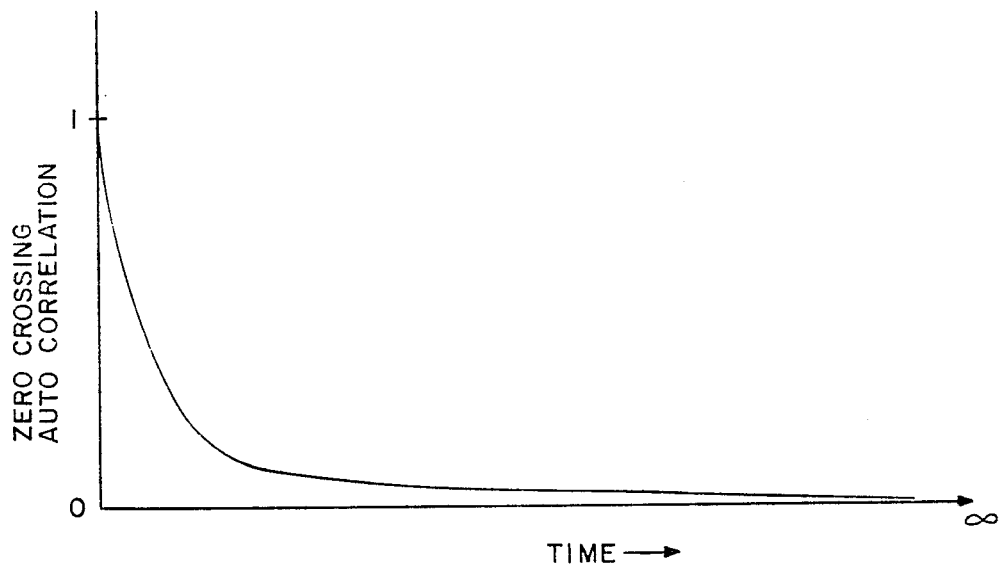
Figure 8:
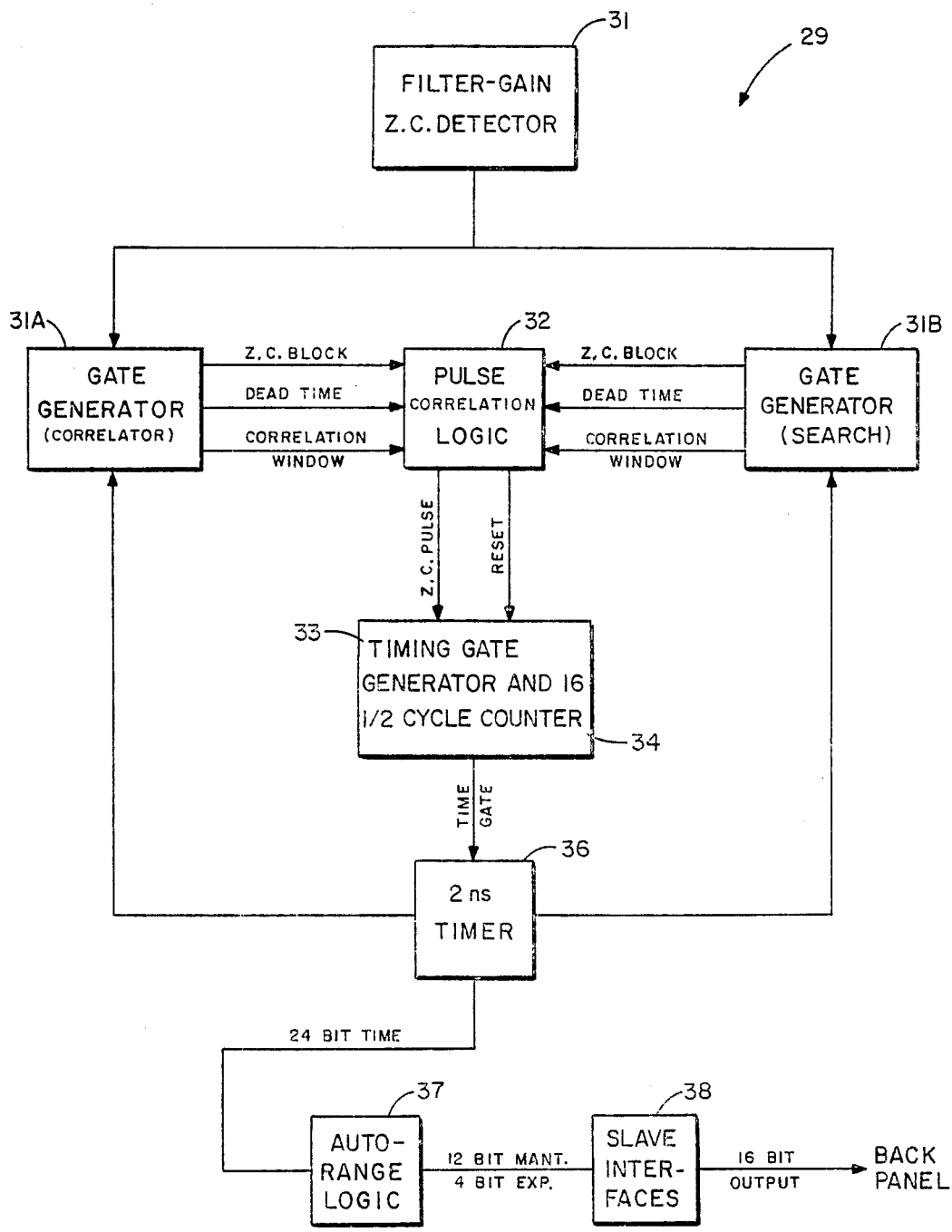

FIG, 6 is a timing diagram for a clean signal;

FIG. 7 is a diagram representing the zero crossing auto correlation function for the random noise component of a composite signal;

FIG. 8 is a block diagram of the frequency measuring system of the invention

Figure 9:
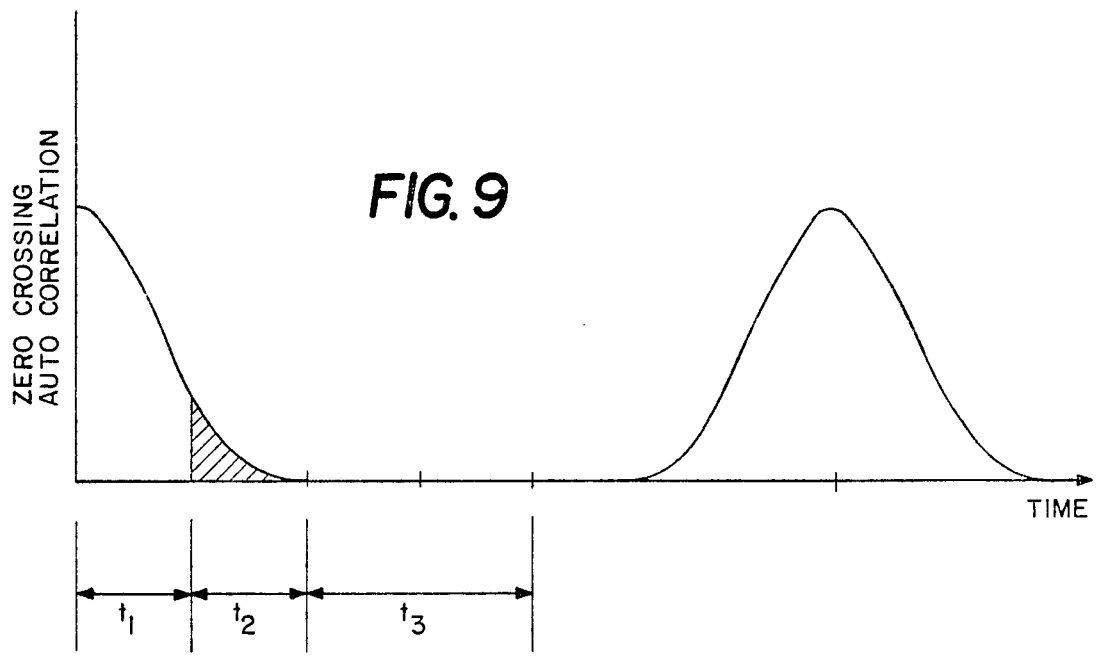
Figure 10:
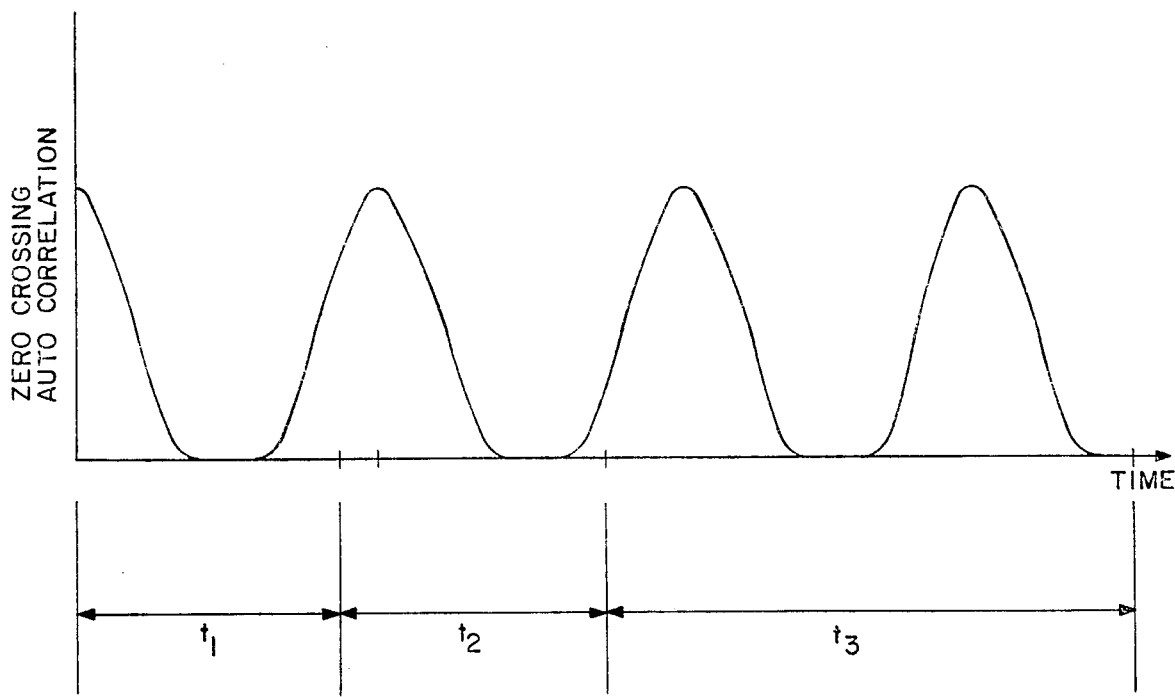
Figure 11:
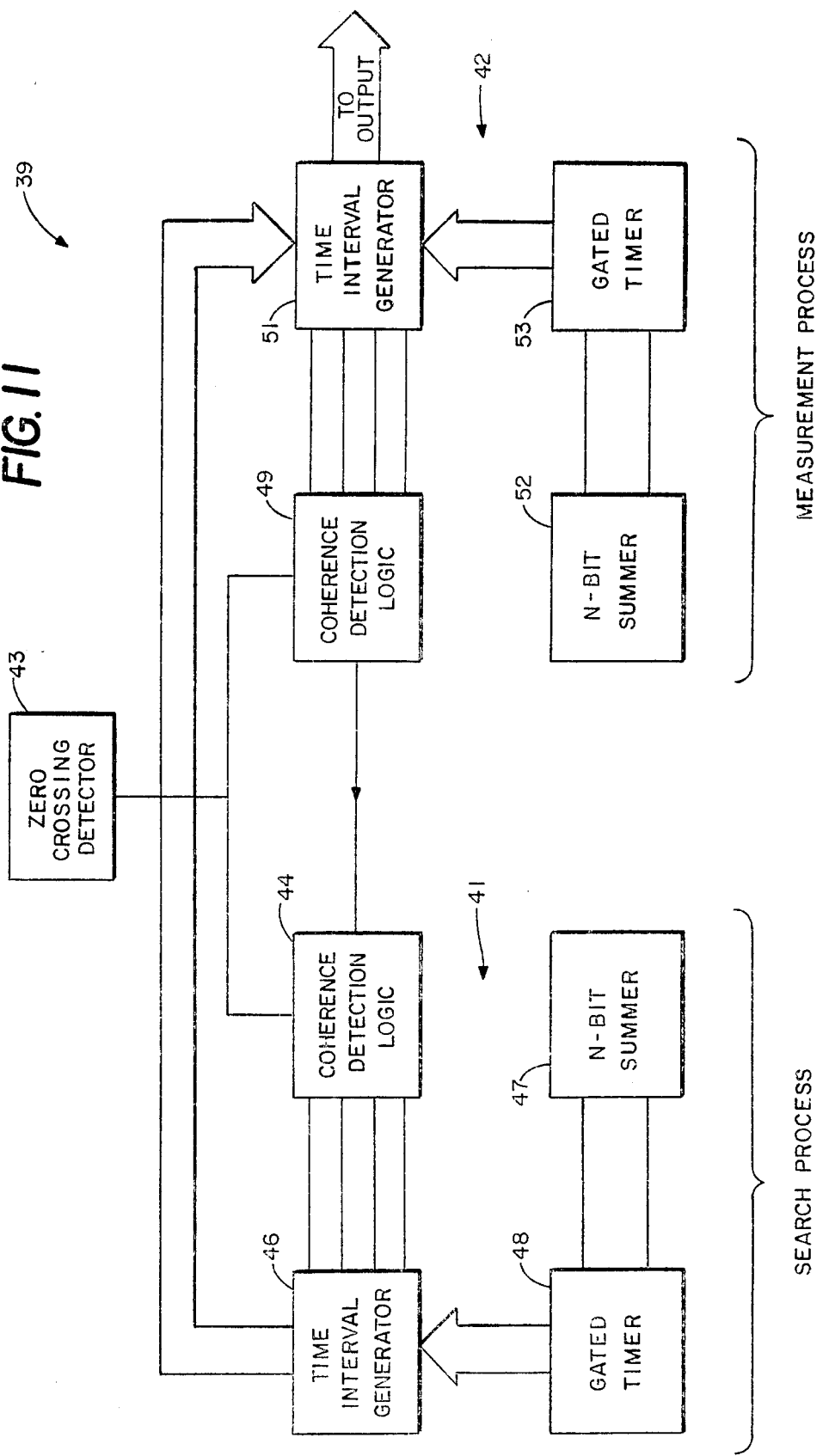

FIG. 9 is a diagram representing the auto correlation function related to time intervals $t_1$, $t_2$, and $t_3$;

FIG. 10 is a diagram representing the auto correlation function and time intervals $t_1$, $t_2$, and $t_3$ when predicted $t_0$ is greater than the actual $t_0$; and FIG. 11 is a block diagram of the frequency measuring system that simultaneously employs the search process and the actual measurement process.

DESCRIPTION OF PREFERRED EMBODIMENT

Referring to FIG. 1, there is shown a diagram of a differential Doppler system indicated generally at 10. System 10 includes a laser 11 generating a light beam 12 which is directed toward a light beam splitter 13. Beam splitter 13 separates the light beam 12 into two light beams 12A and 12B and directs these light beams to a focusing lens 14. Light beams 12A and 12B cross in a focusing area which forms a measuring volume 15. Receiving optics 16 are aligned with a photo detector 17 to receive scattered light 18 from scattering regions 23, 24, 25 and 26, as seen in FIG. 3, in measuring volume 15. Photo detector 17 converts the light signals into electrical signals. A time-frequency signal 28 representative of a particle moving through the measuring volume is illustrated in FIG. 4.

A first oscilloscope 19 is used to provide a trace of the output of photo detector 17. A signal processor 21 coupled to photo detector 17 includes the frequency measuring system of the invention. A second oscilloscope 22 coupled to the signal processor 21 is used to provide a trace of particle velocity versus time.

The flow of solid or fluid particles indicated by arrow 27 is perpendicular to a line midway between the plane of the two light beams emanating from focusing lens 14. As illustrated in FIG. 3, in the measuring volume 15 where the light beams 12A and 12B cross and focus, light wave fronts interfere with each other to form alternate regions of high light intensity and low light intensity or light fingers 23, 24, 25, and 26. As a scattering center or particle passes through the measuring volume 15, the variations in the incidence of light cause variations in the intensity of the scattered light. When the scattered light is picked up by photo detector 17, it is converted into an electrical signal whose frequency is proportional to the velocity in which the particle is crossing the interference fingers 23 to 26. The conversion factor from frequency to velocity involves only the distance between the adjacent fingers 23 to 26. This depends on the wavelengths of the light and the intersection angle "a" between the two light beams.

Figure 5A:
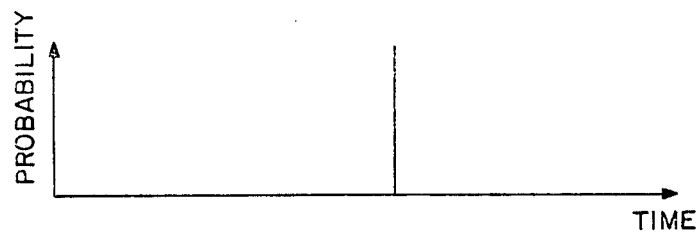
FIG. 5A is a diagram that represents the auto correlation of zero crossing of the component signal for a signal to noise ratio of infinity.
Figure 5B:
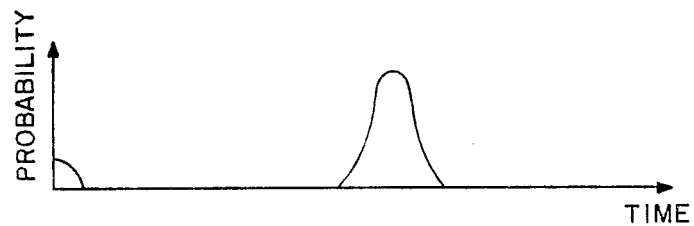
FIG. 5B is a diagram representing the auto correlation of the zero crossing of the component signal for a signal to noise ratio of 4 to 1.
Figure 5C:
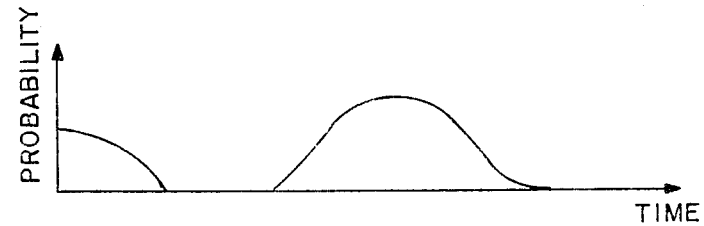
FIG. 5C is a diagram representing the auto correlation of the zero crossing of the component signal for a signal to noise ratio of 2 to 1.
Figure 5D:
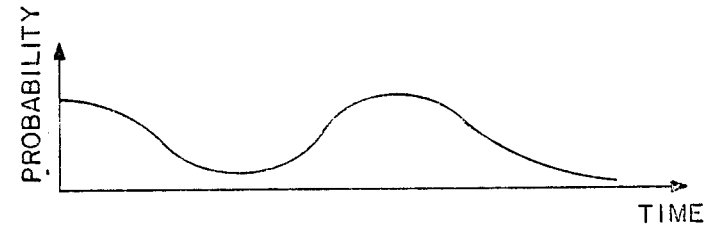
FIG. 5D is a diagram representing the auto correlation function of a composite signal for a signal to noise ratio of 0.9 to 1.

The frequency measuring system of the present invention utilizes certain characteristics of the auto correlation of discrete events, particularly the discrete events as applied to the zero crossing of a signal with a coherent signal. It is useful in explaining the operation of the system to first consider the characteristics of event auto correlation. FIGS. 5A to 5D are graphs of the probability of a zero crossing given the last zero crossing occurred at T=0. The graphs represent the auto correlation of zero crossings of a composite input signal which comprises both sinusoidal components. This is the signal of interest and varying amounts of white noise. The ordinate of the curve is the normalized amplitude of the auto correlator function, the highest value obtainable being infinity, while the abscissa represents the variable delay T employed in computing the degree of correlation between the two versions of the same input signal. FIG. 5A represents the auto correlation of zero crossing of the composite signal for a signal to noise ratio of infinity. FIG. 5B represents the auto correlation of the zero crossing of the composite signal for a signal to noise ratio of 4:1. FIG. 5C represents the auto correlation of the zero crossing of a composite signal for a signal to noise ratio of 2:1. FIG. 5D represents the auto correlation function of a composite signal with a signal to noise ratio of 0.9:1. The auto correlation functions in FIGS 5A to 5D represent the auto correlation function for a composite signal with or without phase changes, discontinuity and low duty cycle, provided that the input is blanked when there is no coherent signal present, and there are at least ten cycles in each burst of the discontinuous coherent signal. The period of the coherent frequency can be determined by calculating the time between the peaks of the discrete event auto correlation function. As is shown by the correlation functions in FIGS. 5A to 5D, even though the noise is of the same order of magnitude as the coherent, the peaks corresponding to the zero crossing of the coherent component are still present.

Rather than compute the entire zero crossing auto correlation function for the composite signal, the frequency measuring system of the present invention is devised to detect and track the presence of the first peak of the above mentioned function. The detection and tracking is accomplished on each individual zero crossing to provide real time information about the coherent component of the signal. The frequency measuring system can distinguish between a composite signal with a coherent component and a composite signal without a coherent component even though the coherent component may only contain a few coherent zero crossings. For example, a sinusoidal signal may contain only two or three cycles in short bursts.

Figure 6:
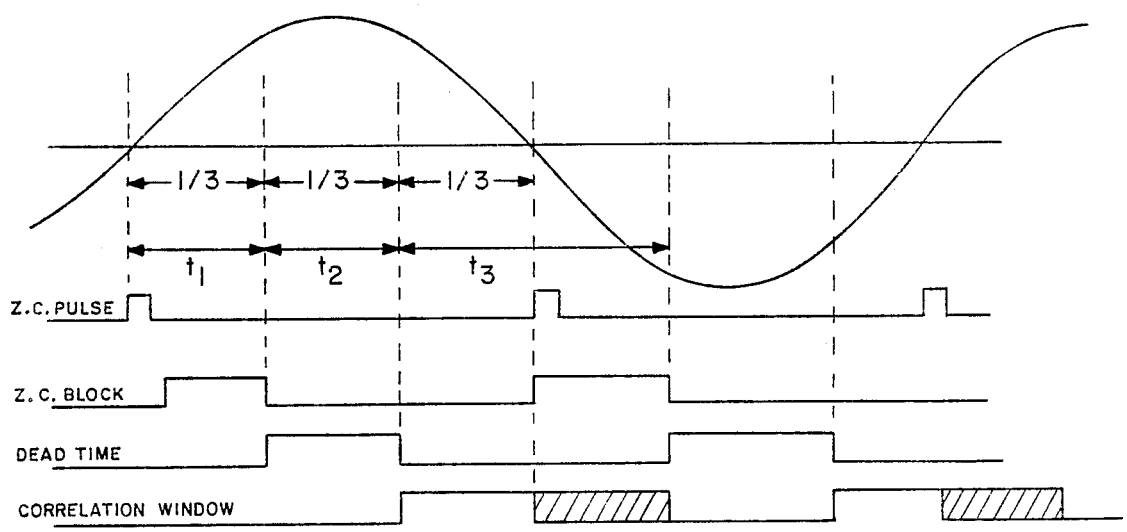

A timing diagram for a clean signal is illustrated in FIG. 6. A time interval generator 33, hereinafter described with reference to FIG. 8, is used to set the time durations or intervals $t_1$, $t_2$, and $t_3$ of the signal during a time period. Assuming the time of the first peak $t_0$ is approximately known and the time intervals $t_1$ and $t_2$ are defined as shown in FIG. 6, a zero crossing due to a composite signal occurring at T=0 causes all successive zero crossings in time interval $t_1$ to be swallowed. No zero crossing will occur within the time interval $t_2$ if the signal to noise ratio exceeds the defined limits, at least one zero crossing will occur in time interval $t_3$. At the occurrence of a zero crossing in time interval $t_3$, the time of occurrence can be measured and a new $t_0$ can be fed back to determine a new $t_1$, $t_2$, and $t_3$. The zero crossing that occurred in $t_3$ also restarts the sequence and is also considered to have occurred at $t_0$, and starts time interval $t_1$ again to swallow any zero crossing due to noise that follows.

The time between a zero crossing occurring at $t_0$ and one occurring within time interval $t_3$ can vary due to the random noise component of the signal. This decreases the accuracy of the measurement. The accuracy of the measurement can be improved by averaging several measurements together. For example, each measurement corresponds to one half cycle of the coherent component of the composite signal and an average of 16 measurements represents a measurement every 8 cycles of the coherent signal.

When a phase shift occurs and a zero crossing does not occur within time interval $t_3$, the measurement is invalid and aborted and $t_0$ is not updated. The first zero crossing that occurs outside of the time interval $t_1$ restarts the timing sequence using the previously valid $t_0$.

When the coherent component disappears leaving only the noise component, a zero cross has a high probability of occurring in time interval $t_2$ as well as time interval $t_3$ as shown in FIG. 7 which represents the zero crossing auto correlator function for the random noise component of a composite signal. When a zero crossing is detected in time interval $t_2$, the measurement is invalid and aborted, $t_0$ is not updated, and the time is reset to zero restarting with time interval $t_1$.

As can be seen by the above mentioned types of composite signals, the system either makes a measurement and feeds back a new $t_0$, which causes new time intervals $t_1$, $t_2$, and $t_3$ to be selected or aborts the measurement and $t_0$ remains unchanged.

In the situation where the coherent signal of a dual duty cycle and continuous random noise is input to the system, the system will wait until a valid set of zero crossings is detected, then it will update $t_0$ and output data. The amount that the coherent signal can vary from one valid measurement to the next is dependent on the width of time interval $t_3$ and the signal to noise ratio of the input signal. Time intervals $t_1$, $t_2$, and $t_3$ are related by $t_1 + t_2 + \frac{1}{2}t_3 = t_3$ and they may be tailored to different situations. For example:

$$t_1 = t_0/4 \quad t_2 = 2tUOD/4 \quad t_3 = 2t_0/4$$

$t_1 = t_0/3$  $t_2 = t_0/3$  $t_3 = 2t_0/3$

FIG. 8 shows a block diagram that represents an application of the frequency measuring system 29 described above. A zero crossing, Z.C., detector 31 generates a zero crossing pulse for all zero crossings and feeds them to coherence detection logic 32 via gate generators 31A and 31B. This logic performs four main functions:

1. Swallows the zero crossing pulse if it occurs during time interval $t_1$.
2. Feeds all other zero crossing pulses to a time interval generator 33.
3. Resets an n-bit summer 34 if a zero crossing occurred during time interval $t_2$ or beyond time $t_3$.
4. Feeds a zero crossing to n-bit summer 34 if the zero crossing occurred during time interval $t_3$.

Time interval generator 33 sets the time durations $t_1$, $t_2$, and $t_3$ for segments of the signal in a time period. The timing diagram of FIG. 6 is an example of the time durations for a sinusoidal signal.

The n-bit summer's purpose is to start and stop the gated timer 36 at the appropriate time when a selected number of signals are counted. Upon receiving the first coherent zero crossing, a zero crossing that occurs during time interval $t_3$ starts timer 36. Each successive coherent zero crossing pulse is counted by an n-bit counter 34 until a predetermined number of measurements to be averaged occurs. The last zero crossing in average causes the n-bit summer 34 to stop timer 36. If a zero crossing outside of time interval $t_1$ or $t_3$ exists, the n-bit summer 34 will be reset and the n-bit summer 34 will reset the gated timer 36, aborting the measurement. Timer 36 is coupled to auto range logic 37 which feeds signals to slave interfaces 38 providing an output on the back panel of signal processor 21.

The gated timer 36 is controlled by the n-bit summer 34 as stated above. Upon receiving the stop command from the n-bit summer 34, the gated timer 36 calculates a new $t_0$ by dividing the time measured by the timer and feeds a new $t_0$ to the time interval generator 33 and also outputs a new $t_0$. If a timer reset is received during a measurement, that measurement is aborted and $t_0$ is not updated.

The time interval generator 33 receives a $t_0$ which is the predicted time that the first peak in the zero crossing auto correlation function that will occur. The time interval generator's purpose is to generate the three time intervals $t_1$, $t_2$, and $t_3$ synchronously to the zero crossing pulses.

As is apparent from the operation thus far, if the predicted $t_0$ fed to the time interval generator 34 is substantially different than the actual $t_0$ of the first peak of the auto correlation function, the system will reject all zero crossings as occurring outside the predicted range of zero crossings to be accepted by time interval $t_3$. In this situation, the system 29 must search for the correct $t_0$.

In the search mode of operation, a $t_0$ is predicted to obtain $t_1$, $t_2$, and $t_3$. The coherence detection logic 32 swallows all zero crossings that occur within $t_1$, however, it allows all other zero crossings to be considered coherent regardless of which time interval they occur in. The n-bit summer 34 and the gated timer 36 operate as stated previously except in this mode $t_0$ is not output, but it is allowed to feed a new $t_0$ to the time interval generator 33. There are two different situations which will be explained separately:

1. Predicted $t_0$ is less than the $t_0$ of the first peak. FIG. 9 represents the auto correlation function and the time intervals $t_1$, $t_2$, and $t_3$ when the predicted $t_0$ is less than the $t_0$ of the first peak. For an auto correlation function represented by the solid line, $t_1$ swallows all extra zero crossings within $t_1$, therefore; all zero crossing fed to the n-bit summer 34 are coherent and the new $t_0$ generated by the gated timer 36 and fed to the timer interval generator 33 will be approximately equal to the actual $t_0$ of the auto correlation function. For a signal that has an auto correlation, some of the zero crossings fed to the n-bit summer 34 will be due to noise and some will be due to the coherent component. The new $t_0$ generated by the gated timer 36 will be somewhere between the predicted $t_0$ and the actual $t_0$. This will cause a new set of time intervals $t_1$, $t_2$, and $t_3$ to be generated. A new $t_0$ will be produced somewhere between the previous predicted $t_0$ and the actual $t_0$. This process continues until $t_1$ is such that all extra zero crossings in the zero peaks are swallowed, then the correct $t_0$ can be generated.

2. The predicted $t_0$ is greater than the actual $t_0$ of the first peak. FIG. 10 represents the auto correlation function and the time intervals $t_1$, $t_2$, and $t_3$ when the predicted $t_0$ is greater than the actual $t_0$. As shown in FIG. 10, $t_1$ will swallow all zero crossings from the first peak, therefore; the $2t_0$ peaks will be generated since $t_1 = t_0/4$ the new $t_1$ will be $\frac{1}{2}$ the actual $t_0$ ($t_1 \times 2$ to $\frac{1}{4} = t_0/2$). The next measurement made will predict the actual $t_0$ and feed it to the time interval generator.

The process of locating the actual $t_0$ is defined as the search process. A block diagram of a search and measurement system 39 that employs both the search process and the actual measurement process simultaneously is shown in FIG. 11.

Search and measurement system 39, shown in FIG. 11, is divided into two parts, the search section 41 and measurement section 42. Both of the sections 41 and 42 have been described earlier. Search section 41 and measurement section 42 are connected to a zero crossing detector 43. Search section 41 has coherence detection logic 44 which receives zero crossing pulses from detector 43. Logic 44 feeds all zero cross pulses other than the zero crossing pulse that occurs during time $t_1$ to time interval generator 46. Each successive coherent zero cross pulse is counted with n-bit summer 47 which is operable to start and stop gated timer 48. Measurement section 42 has coherence detection logic 49 receiving zero crossing pulses from detector 43. Logic 49 feeds all zero cross pulses other than the zero crossing pulse that occurs during time $t_1$ to time interval generator 51. The zero cross pulses are counted with an N-bit summer 52 which is operable to start and stop gated time 53. Zero crossing signals from generator 46 are fed to generator 51 which produces the output signal.

The operation of each section 41 and 42 is identical to the operation as earlier stated except for the following.

1. When the measurement section 42 is processing zero crossings and coherence is detected, the search process is gated off. Only when coherence is not detected by the measurement is the search section 41 allowed to function.

2. When the search section 41 finds a new $t_0$ that is equal to the actual $t_0$ of the auto correlation function, it updates the time interval generator 51 of the measurement section 42.

By having both search and measurement processes in operation simultaneously, the measurement process can monitor all signals for coherence and the search process can ensure that the $t_0$ of the auto correlation function is within the range of the measurement process.

While there has been shown and described an embodiment of the apparatus for measuring velocity of flowing solid and fluid particles, such as particles moving in air, it is understood that the apparatus is useable with other moving particles such as blood cells to monitor the flow of blood in vivo. The apparatus embodies the method for measuring the frequency of the coherent component of a composite signal resulting from particles moving through a measuring volume. Changes in the components and arrangement of components may be made by those skilled in the art without departing from the invention. The invention is defined in the following claims.

I claim:

1. Apparatus for measuring velocity of flowing particles, comprising
    (a) means for generating a light beam;
    (b) means for splitting the light beam into separate light beams;
    (c) means for focusing the separate light beams in a crossing and focusing area providing a measuring volume having alternate regions of high and low light intensity, respectively, said flowing particles moving through said measuring volume normal to said regions of light intensity to produce variations in the intensity of scattered light; (d) means for sensing said scattered light and for producing an electrical signal having a frequency corresponding to said variations in the intensity of scattered light which is proportional to the velocity at which a particle moves through said measuring volume, said signal having a segment thereof at a zero crossing of a particle through said measuring volume; and
    (e) signal processor means for processing said electrical signal and including means for tracking an individual zero crossing of a particle to produce real time information about a coherent component of the signal, said tracking means including
        (1) a zero crossing detector for generating zero crossing pulses during a selected time period,
        (2) coherence detection logic means for receiving said zero crossing pulses and for providing a signal for a zero crossing at a selected time interval of said time period;
        (3) first time interval generator means for setting time intervals of the signal;
        (4) n-bit summer means for counting the signals for a zero crossing at a selected time interval; and
        (5) gated timer means controlled by said summer means to allow an output signal after a selected number of signals have been counted during the selected time interval.

2. Apparatus as defined in claim 1, wherein the time period has first, second, and third time segments, said third time segment being equal to the sum of the first and second time segments, said third time segment being the selected time interval.

3. Apparatus as defined in claim 1, wherein the time period has a plurality of time segments, the last time segment being the selected time interval.

4. Apparatus as defined in claim 1, and further comprising means for searching for a start time of a zero crossing of a particle through the measuring volume and updating the time interval generator when the time equals the actual time of a zero crossing of a particle through the measuring volume.

5. Apparatus as defined in claim 4, wherein said means for searching for a time of a zero crossing of a particle through the measuring volume includes
    (1) second coherence detection logic means for receiving zero crossing pulses from the zero crossing detector during a selected time period and providing a signal for a zero crossing at a selected time interval during the time period;
    (2) second time interval generator means for setting the time intervals of the signal, said second time interval generator means being connected to the first time interval generator means and updating the time interval of said first generator means;
    (3) n-bit summer means for counting the signals for a zero crossing at a selected time interval; and
    (4) second gated timer means controlled by a second summer means to allow an output signal to the first time interval generator means after a selected number of signals have been counted during the selected time interval.

6. Apparatus as defined in claim 4, wherein the time period for said means for searching a start time has a plurality of time intervals, said selected time interval being the last time interval.

7. Apparatus as defined in claim 4, wherein the time period for said means for searching a start time has first, second and third time intervals, said selected time interval being the third time interval.

8. Apparatus as defined in claim 7, wherein the sum of the first and second time intervals equals the third time interval.

9. In an apparatus having means operable to focus separate light beams in a crossing and focusing area to provide a measuring volume having alternate regions of high light intensity and low light intensity wherein flowing particles moving through said measuring volume normal to said regions of light intensity produce variations in the intensity of scattered light, and means accommodating said scattered light and providing a signal having a segment thereof at a zero crossing of a particle through said measuring volume and a frequency related to said variations in the intensity of scattered light which is proportional to the velocity at which the particle moves through said measuring volume, the improvement which comprises
    signal processor means for processing said signal and including means for detecting a zero crossing of a particle to produce real time information about a coherent component of the signal, said detecting means including
        (1) means for generating zero crossing pulses during a time period;
        (2) coherence detection logic means for receiving said zero crossing pulses and providing a signal for a zero crossing at a selected time interval of said time period;
        (3) first time interval generator means for selecting time intervals of the signal during the time period;
        (4) n-bit summer means for counting the signals for a zero crossing at a selected time interval; and
        (5) timer means controlled by the summer means to allow an output signal during the selected time interval.

10. Apparatus as defined in claim 9, wherein the time period has first, second, and third time segments, said third time segment being equal to the sum of the first and second time segments, said third time segment being the selected time interval.

11. Apparatus as defined in claim 9, wherein the time period has a plurality of time segments, the last time segment being the selected time interval.

12. Apparatus as defined in claim 9, and further comprising searching for a start time of a zero crossing of a particle through the measuring volume and for updating the time interval generator when the time equals the actual time of a zero crossing of a particle through the measuring volume.

13. Apparatus as defined in claim 12, wherein the time period for said means for searching a start time has a plurality of time intervals, said selected time interval being the last time interval.

14. Apparatus as defined in claim 12, wherein the time period for said means for searching a start time has first, second and third time intervals, said selected time interval being the third time interval.

15. Apparatus as defined in claim 14, wherein the sum of the first and second time intervals equals the third time interval.

16. Apparatus as defined in claim 9, wherein said means for searching for a time of a zero crossing of a particle through the measuring volume includes
  (1) second coherence detection logic means for receiving zero crossing pulses from the zero crossing detector during a selected time period and for providing a signal for a zero crossing at a selected time interval during the time period;
  (2) second time interval generator means for setting the time intervals of the signal and connected to said first time interval generator means and updating the time interval of said first generator means;
  (3) n-bit summer means for counting the signals for a zero crossing at a selected time interval; and
  (4) second gated timer means controlled by the second summer means to allow an output signal to said first time interval generator after a selected number of signals have been counted during the selected time interval.

17. Apparatus for measuring frequency of a coherent component of a composite signal, comprising
  (a) means for producing a composite signal;
  (b) means for detecting a first signal of said composite signal during a selected time period;
  (c) means for establishing time intervals of the composite signal during said time period;
  (d) means for generating a pulse which establishes a second signal from said first signal during the selected time period; and counter means for counting a plurality of said second signals and allowing an output signal when a selected number of second signals have been counted during a selected time interval to provide real time information about the coherent component of the composite signal;
  (e) said means for detecting a first signal including
    (1) a detector for generating zero information pulses during a selected time period;
    (2) coherence detection logic means for receiving said information pulses and for providing said second signal for a selected time interval of said time period;
    (3) first time interval generator means for setting the time intervals of the signal;
    (4) n-bit summer means for counting the second signals at a selected time interval; and
    (5) gated timer means controlled by said summer means to allow an output signal after a selected number of second signals have been counted during the selected time interval.

18. Apparatus as defined in claim 17, wherein the time period has first, second, and third time segments, said third time segment being equal to the sum of said first and second time segments, said third time segment being the selected time interval.

19. Apparatus as defined in claim 17, wherein the time period has a plurality of time segments, the last time segment being the selected time interval.

20. Apparatus as defined in claim 17, and further comprising means for searching for a start time of the information pulse and updating the time interval generator when the time equals the actual time of an information pulse.

21. Apparatus as defined in claim 20, wherein said means for searching for a time of the information pulse includes
  (1) second coherence detection logic means for receiving information pulses from the detector during a selected time period and for providing a third signal for information at a selected time interval during the time period;
  (2) second time interval generator means for setting the time intervals of the third signal and connected to the first time interval generator means and updating the time interval of said first generator means;
  (3) n-bit summer means for counting the third signals for an information pulse at a selected time interval; and
  (4) second gated timer means controlled by said second summer means to allow an output signal to said first time interval generator after a selected number of third signals have been counted during the selected time interval.

22. Apparatus as defined in claim 20, wherein the time period for the means for searching a start time has a plurality of time intervals, said selected time interval being the last time interval.

23. Apparatus as defined in claim 20, wherein the time period for the means for searching a start time has first, second and third time intervals, said selected time interval being the third time interval.

24. Apparatus as defined in claim 23, wherein the sum of the first and second time intervals equals the third time interval.

* * * * *